US008821988B2

(12) United States Patent
Gokhale (10) Patent No.: US 8,821,988 B2
(45) Date of Patent: Sep. 2, 2014

(54) METHOD FOR MODIFICATION OF THE SURFACE AND SUBSURFACE REGIONS OF METALLIC SUBSTRATES

(71) Applicant: Dayton T. Brown, Inc., Bohemia, NY (US)

(72) Inventor: Atul Gokhale, Bohemia, NY (US)

(73) Assignee: Dayton T. Brown, Inc., Bohemia, NY (US)

( * ) Notice: Subject to any disclaimer, the term of this patent is extended or adjusted under 35 U.S.C. 154(b) by 0 days.

(21) Appl. No.: 13/632,348

(22) Filed: Oct. 1, 2012

(65) Prior Publication Data

US 2014/0093653 A1   Apr. 3, 2014

(51) Int. Cl.
*H05B 6/02* (2006.01)
*H05B 6/06* (2006.01)
*B05D 7/14* (2006.01)

(52) U.S. Cl.
USPC .......................................................... 427/543

(58) Field of Classification Search
None
See application file for complete search history.

(56) References Cited

U.S. PATENT DOCUMENTS

| | | | |
|---|---|---|---|
| 4,307,276 A * | 12/1981 | Kurata et al. ................. | 219/650 |
| 4,481,237 A | 11/1984 | Bosshart et al. | |
| 4,540,596 A | 9/1985 | Nimmagadda | |
| 5,128,172 A | 7/1992 | Whittick | |
| 5,362,523 A | 11/1994 | Gorynin et al. | |
| 5,534,313 A | 7/1996 | Kung et al. | |
| 5,834,070 A | 11/1998 | Movchan et al. | |
| 6,123,998 A | 9/2000 | Takahashi et al. | |
| 6,936,118 B2 | 8/2005 | Ando et al. | |
| 7,229,700 B2 | 6/2007 | Ruggiero et al. | |
| 7,390,534 B2 | 6/2008 | Park et al. | |
| 7,396,563 B2 | 7/2008 | Scarlete et al. | |
| 7,517,375 B2 | 4/2009 | Cook et al. | |
| 7,521,017 B2 | 4/2009 | Kunze et al. | |
| 7,632,768 B2 * | 12/2009 | Yokota et al. ................. | 501/96.4 |
| 7,910,219 B1 | 3/2011 | Withers et al. | |
| 7,931,683 B2 | 4/2011 | Weber et al. | |
| 8,066,937 B2 | 11/2011 | Pickard et al. | |
| 8,084,089 B2 | 12/2011 | Meckel | |
| 8,118,561 B2 | 2/2012 | Bruce et al. | |
| 8,128,861 B1 | 3/2012 | Aghajanian et al. | |
| 2008/0096043 A1 * | 4/2008 | Pereira Da Silva ........... | 428/610 |
| 2009/0282949 A1 * | 11/2009 | Seals et al. ....................... | 75/302 |
| 2009/0311545 A1 | 12/2009 | Gerke et al. | |
| 2013/0045334 A1 * | 2/2013 | Seals ............................. | 427/446 |

* cited by examiner

*Primary Examiner* — Timothy Meeks
*Assistant Examiner* — Ina Agaj
(74) *Attorney, Agent, or Firm* — Collard & Roe, P.C.

(57) ABSTRACT

A method for surface engineering a metal substrate involves mixing precursor powders with a polymer binder to create a coating mix and coating the substrate with the coating mix. The substrate is then heated via induction heating, with the frequency and duration of the heating being controlled so as to cause a reaction of the precursor powders to create one or more types of ceramics or intermetallics, evaporate the polymer binder, melt a portion of the substrate, and cause the synthesized compounds to mix with the substrate and form a compositionally graded surface modification. The compound(s) created by the reactions are mixed with molten portion of the substrate and upon re-solidification of the substrate, are distributed at decreasing percentages along a depth of the substrate so that their content varies from 100% at a surface of the substrate to 0% at a defined depth of the substrate.

7 Claims, 10 Drawing Sheets

◊ Titanium Diboride (TiB$_2$) - Superhard
○ Boron Nitride (h-BN) - Highly Lubricating

METHOD FOR MODIFICATION OF THE SURFACE AND SUBSURFACE REGIONS OF METALLIC SUBSTRATES

BACKGROUND OF THE INVENTION

1. Field of the Invention

This invention relates to a method for engineering the surface and near-surface regions of metallic substrates such that a ceramic or intermetallic-rich layer is produced by using a method we term as Assisted Combustion-Enhanced Synthesis (or henceforth ACES). Recognizing and stressing that the method described herein produces a surface modification with characteristics that are substantially different than any of the prior art, the method can be termed as a method of producing ACES-modified surfaces. In particular, the invention relates to a method for producing ACES-modified surfaces on a metallic substrate by applying a polymer carrier containing precursors for the combustion synthesis of ceramics or intermetallics, and induction heating the substrate to cause the precursors to react with each other and mix with the substrate to create a tightly bonded ceramic or intermetallic-containing surface modification zone on the substrate.

2. The Prior Art

It has long been known to coat metallic parts with a ceramic coating to improve their wear resistance, corrosion resistance and performance. There are many different ways to coat the substrate, including plasma spray coating, physical vapor deposition, and diffusion coating.

However, all of these processes require that the coating material be prepared first and then applied to the substrate for adhesion to the substrate. In addition, the coatings often do not adhere well to the substrate, and develop cracks and spalling.

SUMMARY OF THE INVENTION

It is therefore an object of the present invention to provide a method for ACES-modification of a substrate where the ceramic or intermetallic precursors are applied to the substrate, and the synthesis of the ceramics or intermetallics is carried out in-situ after application to the substrate.

It is another object of the invention to provide a method for ACES-modification of a substrate in which the modified surface regions are integral with the substrate resulting in a very low risk of cracking or spalling.

These and other objects are accomplished by a method for surface modification of a substrate that comprises coating a metal or alloy substrate with a polymer spray coat containing precursors of the ceramics or intermetallics that are later synthesized, and induction heating the substrate to cause the precursors to react with each other, the polymer to evaporate, and the reaction products to mix with the substrate to form a superior bond. One key aspect of this invention is the manner in which the in-situ synthesized particles or particle agglomerates (henceforth called constituent(s)) are incorporated in the surface and sub-surface regions of the metal or alloy surfaces on which they are formed. There is a unique balance of energy such that during and/or immediately after the formation of the newly-synthesized constituent(s), a thin portion (defined as less than 5% of the total thickness of the substrate) of the substrate surface melts and the constituent(s) are incorporated into the molten surface layer.

Initially, the precursor materials for ACES-modification are in powder form and are mixed with each other in a polymer binder. Examples of precursor powders are compounds containing nickel, aluminum, titanium, iron, molybdenum, boron, silicon and carbon.

These precursor constituents react upon heating to form the metallic or intermetallic final compounds in the surface modification zone. Examples of suitable compounds are nickel-aluminide, iron-aluminide, titanium-aluminide, molybdenum-disilicide, iron-silicide, titanium-diboride, titanium-carbide, boron-nitride, silicon-carbide or boron-carbide. In one embodiment, the surface modification is formed from a composite of $TiB_2$, which gives high wear resistance, and BN, which provides stable high-temperature solid-state lubrication. In this embodiment, the precursor powders are $T_1$, $B_2O_3$, and B. These powders are mixed with a polymer binder in ratios that optimize the synthesis reactions. It is essential to produce a uniform mix of the precursor powders in optimized ratios, which requires an assessment of the losses of each precursor in the mixture during the reactive synthesis step. Such losses are typically less than 5 atomic %, but must be compensated in order to produce the correct stoichiometry in the final mixture. Since many of the metallic precursors in very fine powder form are amphoteric, all mixing and storage takes place an inert atmosphere (e.g. Argon). The pre-mixed powder mass is mixed with a polymer carrier (e.g. Poly(m-ethyl methacrylate) (PMMA)) and a stearic stabilizer (anti-flocculent) for maintaining a proper dispersion of the powders.

Once the polymer coating material has been prepared, it is sprayed on to the desired substrate. In some instances, separate polymer solutions may be prepared (one for each precursor type) and sprayed sequentially in order to achieve the desired dispersion. The polymer coating thickness can be controlled by using multiple coating/drying cycles.

After the coating has been applied and dried, high frequency induction heating is applied to the substrate. Because the heating occurs at the interface between the polymer film and the substrate surface, the heated zone within the substrate can be controlled very precisely.

The coated substrate can be heated to a controlled depth by controlling the supply frequency. It should be stressed, however, that the supply frequency is not the only controlling factor. In fact, control of this process is complex, involving other parameters:

1. The details of the synthesis reactions, including:
   a. Extinction limit (no combustion even upon intense initiation)
   b. Stability limit (steady or unsteady wave propagation)
   c. Front propagation velocity
   d. Maximum combustion temperature
   e. Heating rate in the combustion front
   f. Pulsation frequency, hot spot velocity, etc. (in case of unsteady combustion)
   g. Extent of conversion;
2. The power density of the induction coil;
3. The rate of heat transfer to the substrate;
4. The rate of inductor translation;
5. Heat of reaction of the precursors;
6. Changes in the heat capacity of the reactants, products, and substrate as a function of temperature;
7. Change in the magnetic permeability of the substrate as a function of temperature;
8. Change in the magnetic susceptibility of the substrate as a function of temperature;
9. Change in the electrical resistivity and heat capacity of the substrate as a function of temperature;
10. Radiative, convective, conductive, and evaporation losses; and 11. Heat exchanges due to phase changes (e.g. melting of the substrate);

The substrate surface temperature is increased by induction heating to start the synthesis reaction in the polymer film. Once the reaction starts, heat of reaction is released that will (i) provide the thermal impetus to further the reaction (known as combustion synthesis) and (2) raise the temperature of the substrate. The heat input to the substrate and the rate of induction coil translation will be optimized such that during and momentarily after the synthesis of reaction products, a layer of the substrate is molten (between 0.00001 and 0.1 inch, depending on the application requirements) and immediately refreezes as the heating coil moves to the adjacent location.

The polymer carrier completely evaporates at the reaction front due to the very high local temperatures generated by the synthesis reaction(s), leaving a mass of reacted particles behind. Another optimization of the heat source involves the rate of inductor translation such that enough residence time is afforded to cause the synthesized particles to mix with the molten layer, which, as noted earlier, will refreeze when the induction coil (inductor) moves away, thus forming a surface modification zone.

Heating of the substrate will start synthesis reactions between the mixture of precursor particles held within the polymer film and sometimes compounds in the atmosphere as well. The reactions, being highly exothermic, generate a significant amount of heat. As a result, the polymer film will start to vaporize off, leaving behind pure products of the synthesis reactions. At this stage, if the heat transfer is adjusted such that a thin layer of a portion of the induction-heated "skin" is melted, then the synthesized ceramic or intermetallicparticles will mix with the molten layer of the substrate. Furthermore, because of the induction heating, the molten zone will be stirred due to induced eddy currents, thus thoroughly mixing the ceramic particles with the molten substrate.

As the inductor moves away, the heat transfer will be primarily through the substrate, and the molten substrate layer will start to regrow (i.e. re-solidify). During regrowth, some of the ceramic particles will be trapped, while a majority will be rejected ahead of the solidification front. As a result, the average composition of the regrowth region will gradually change from a low volume fraction of ceramic particles to a high volume fraction, eventually reaching almost 100% on the outer surface. In this manner, the present invention uniquely combines in the same processing sequence both the synthesis and the incorporation of a multicomponent ceramic mixture. Furthermore, a trapping gradient that is the natural result of this unique process will generate a surface modification zone with compositional (and therefore functional) gradation.

An additional factor is the surface finish after processing. The coated surfaces made according to the present invention do not require finishing after processing, and mimic the pre-processing roughness of the surface because the ceramic particles synthesized via this route will be extremely fine (due to fine-sized precursors, including, but not limited to nano-sized) and thus control surface roughening at the ultrastructural level.

The present invention has the advantages of (1) creating coatings of any desired content; (2) ability to synthesize multicomponent mixtures in-situ, (3) ability to modify surfaces that are not line-of-sight, (4) ability to produce surfaces with very low impurity content, and (5) ability to produce a gradation of the composition in the modified zone such that the properties change gradually rather than abruptly. Because of the last factor, the surfaces and near-surface regions modified by this technology are better able to withstand high levels of thermal, mechanical, and chemical stresses. Thus, the coupling of various features uniquely accessible via this invention will allow components to be used in various critical applications ranging from gun barrels to biomedical implants at higher performance levels and for longer periods of time.

The method of the present invention can be used for coating many different types of objects, such as those listed below. This list is by no means comprehensive and is not intended to exclude other applications of this technology.
1. Flexible Armor.
2. Rocket nozzles.
3. Biomedical implants.
4. Bomb Racks.
5. Missile Cones.
6. Hydraulic Pistons, Cylinders, etc.
7. Systems requiring very stable solid-state lubrication in contaminating environments.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
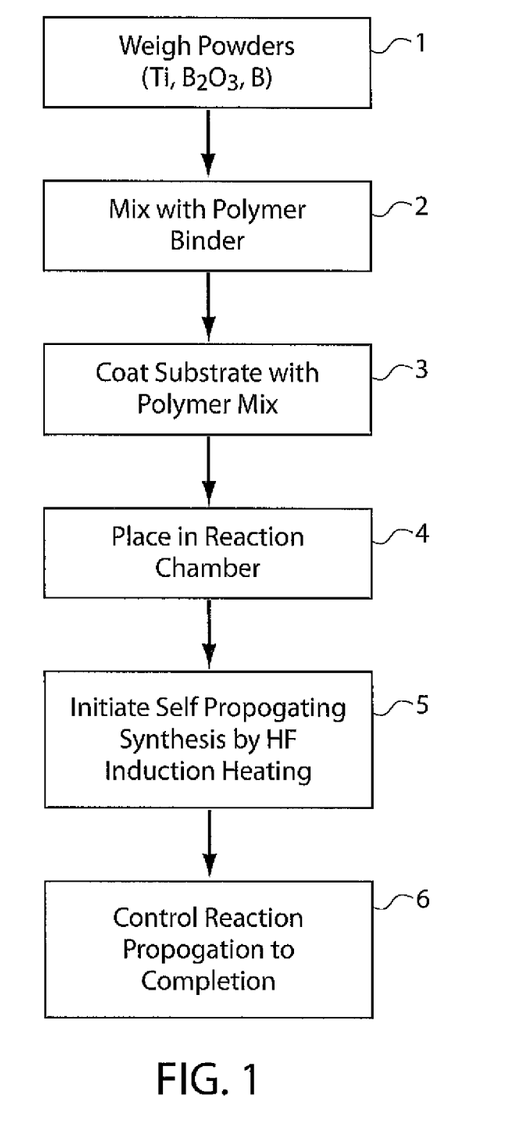
FIG. 1 shows a flow diagram of the basic method steps according to the invention.

Referring now in detail to the drawings, FIG. 1 shows a flow diagram of the basic steps involved in the method according to the invention. First, in step 1, the precursor compounds must be precisely weighed. These compounds are in powder form and the ratios of the precursors should be optimized based on evaporation loss of the components during heating. Second, in step 2, the powders are mixed with a polymer binder such as PMMA and a stearic stabilizer (antiflocculant) to produce the spray coating.

Viscosity measurements are used in order to assess and achieve a well-dispersed suspension prior to spraying. For this purpose, the critical solid loading fraction for the suspension/powder mixture combination is determined. Next, the following empirical relationship $$\eta_m = \eta_b\left(1 - \frac{\phi}{\phi_0}\right)^{-2}$$

Where $\eta_m$ is the Mixture Viscosity $\eta_b$ is the Binder Viscosity $\phi$ is the Powder Solid Loading Fraction $\phi_0$ is the Critical Solid Loading Fraction is used to determine the viscosity for the solid loading desired for the particular application. The Powder Solid Loading Fraction is the fraction of the total weight of the solids added to a polymer carrier that creates the suspension. The critical Solid Loading Fraction is the maximum amount of solid particles that can be added to a polymer melt without flocculation.

Various stirring speeds are used to determine the speed at which the viscosity is stable and close to that predicted by the above equation. The stirring conditions thus determined will be used to create the polymer suspension prior to spraying.

Figure 2:
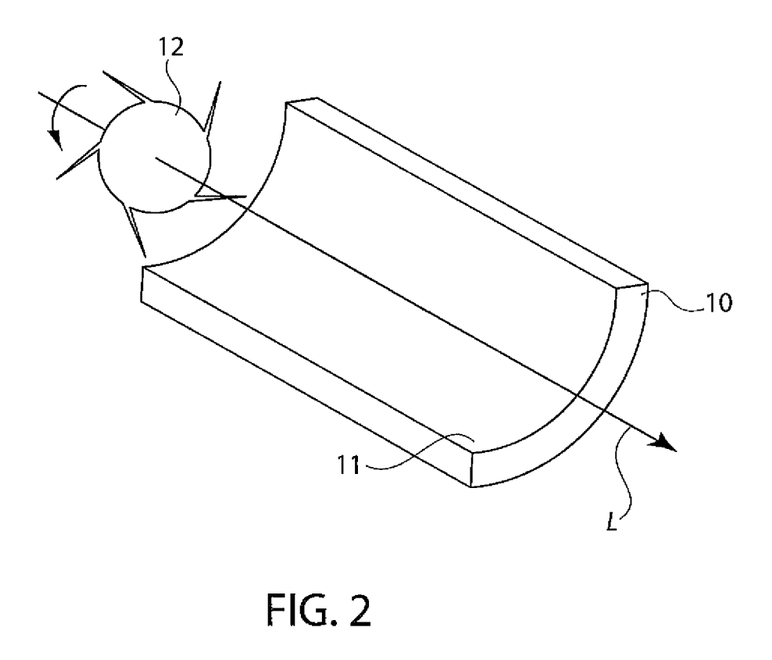
FIG. 2 shows a substrate being spray coated on its inside surface with the precursor mixture.

Next, in step 3, a substrate is coated with the polymer mix. One preferred method for coating the substrate is shown in FIG. 2. Here, a spray coating apparatus 12 is moved along axis L of a substrate 10, to coat inside surface 11 with the polymer mix. Multiple layers of coating can be applied with intermediate drying. The layers can have the same mixture of precursor powders, or each layer can have a different precursor powder.

Figure 3:
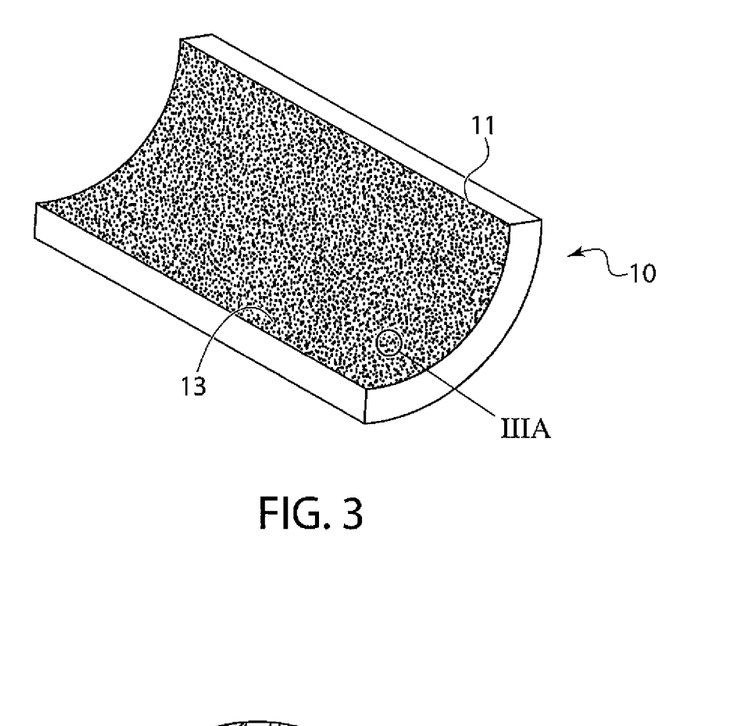
FIG. 3 shows the substrate surface of FIG. 2 after spray coating.
Figure 3A:
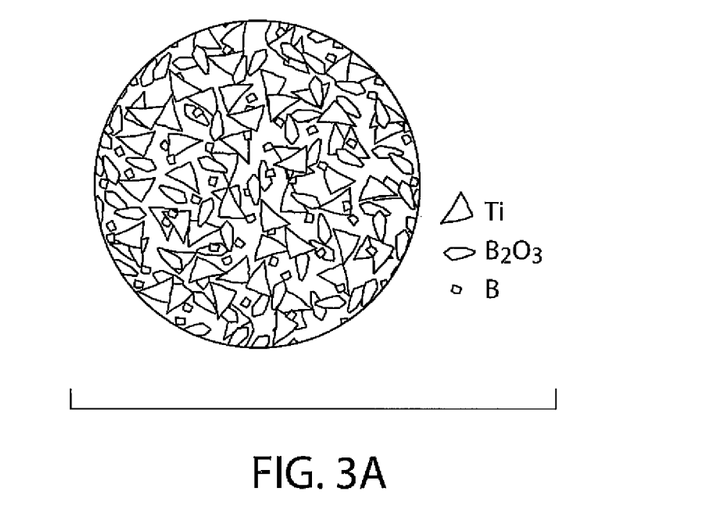
FIG. 3A shows an enlarged view from IIIA in FIG. 3, showing the individual precursor compounds in the coating mixture.

One example of a substrate 10 coated according to steps 1-3 of the present invention is shown in FIGS. 3 and 3A. FIG. 3 shows inside surface 11 coated with a layer 13 of polymer mix. Here the mix is formed from a mixture of Ti, $B_2O_3$ and B powders with a polymer binder. These particles are shown magnified in FIG. 3A.

Figure 4:
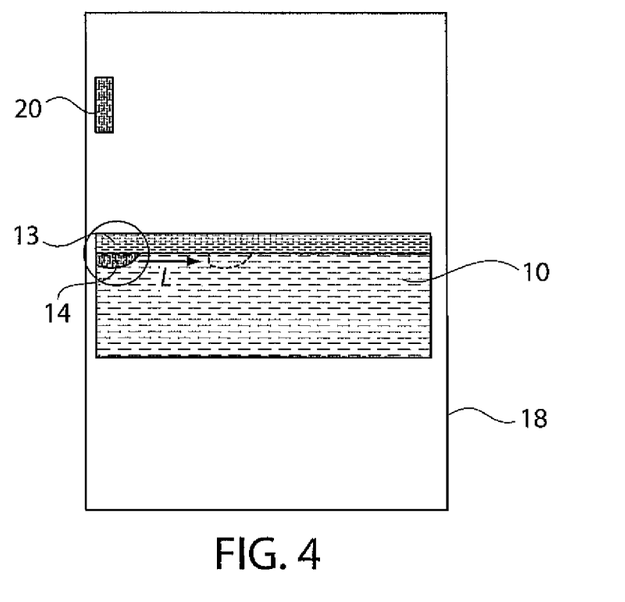
FIG. 4 shows a side view of the substrate during induction heating.
Figure 5:
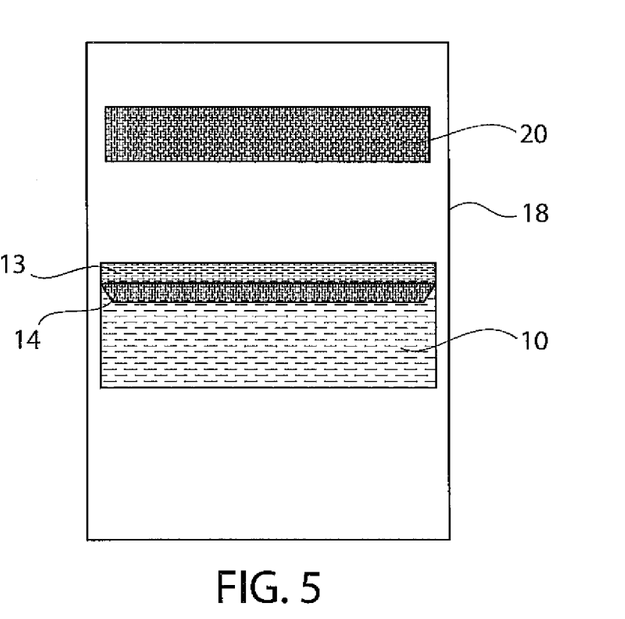
FIG. 5 shows an end view of the substrate during induction heating.

In step 4, the coated substrate is placed into a reaction chamber 18 (shown in FIGS. 4 and 5) containing an inductor 20 for inductively heating the substrate. In step 5, the coated substrate 10 is heated with inductor 20 that moves along axis L to heat the entire length of substrate 10, as shown in FIGS. 4 and 5. In step 6, the components in the coating react to form the final coating on the substrate. This will be explained in further detail as follows.

Inductor 20 heats a portion 14 of substrate 10, down to a desired thickness and in turn heat by conduction the precursor-filled polymer film 13 during this process. The heated portion 14 of substrate 10 is also referred to as the skin depth. The skin depth can be controlled by controlling the supply frequency of the inductor, as follows $$\delta = \sqrt{\frac{\rho}{\pi f \mu_r \mu_0}}$$

where $\delta$ is the Skin Depth in meters $\rho$ is the Resistivity in $\mu\Omega \cdot cm$ f is the Frequency in Hz $\mu_0$ is the Vacuum Permeability $4\times10^{-7}\pi$ in $V \cdot s/(A \cdot m)$

$\mu_r$ is the Relative Permeability (dimensionless)

Figure 6:
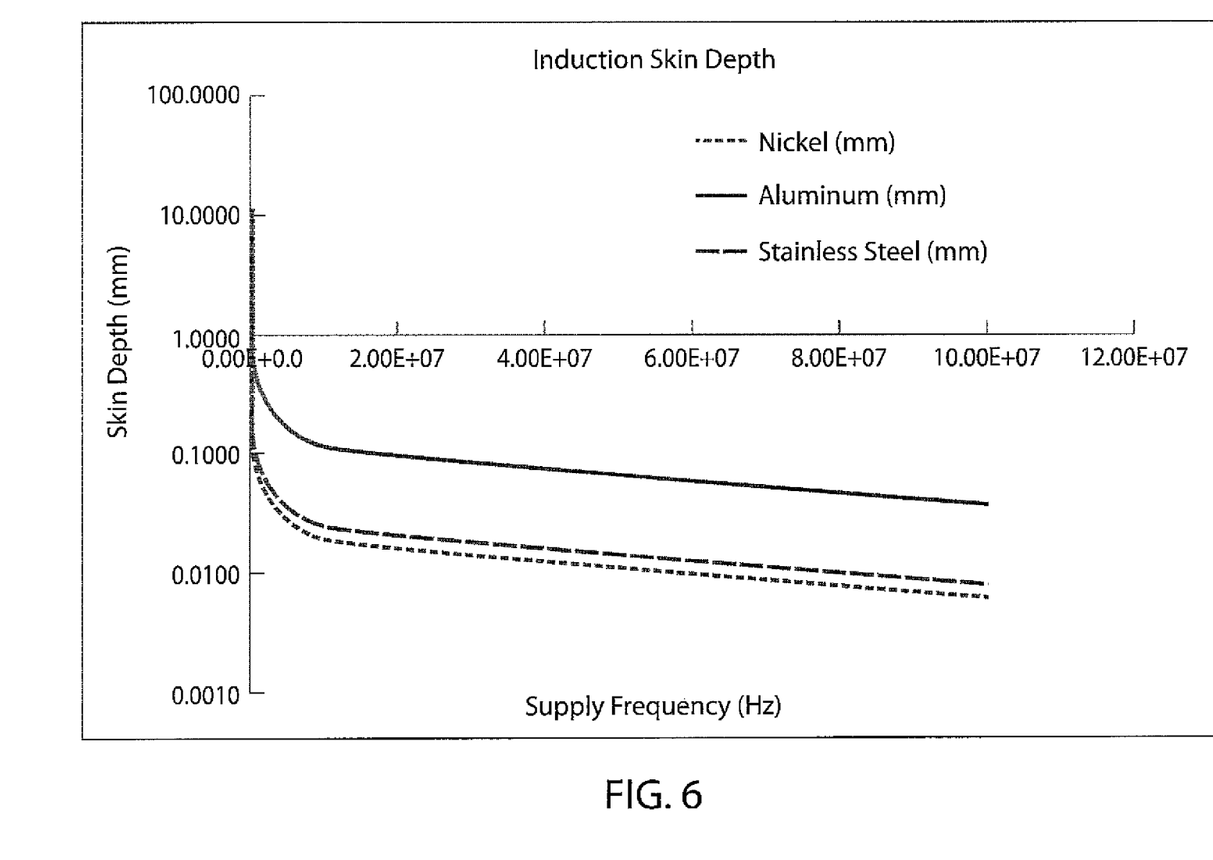
FIG. 6 shows a graph of the supply frequency of the induction heater vs. the skin depth of the substrate during heating.

In the above equation, the Resistivity is the resistivity of the substrate, and the relative permeability is the permeability of a substance (in this case the substrate) with respect to that of a vacuum. Frequency is the supply frequency of the inductor. FIG. 6 shows a graph of the supply frequency vs. the skin depth of various substrates, which each have various resistivities and permeabilities. As can be seen in FIG. 6, increasing the frequency decreases the skin depth for all substrates. Thus, the skin depth can be precisely controlled by controlling the frequency, taking into account the properties of the substrates used. For example, to create a skin depth of 0.01 mm in a nickel substrate, a supply frequency of approximately $6\times10^7$ Hz is used. Generally, frequencies of between $10^5$ and $10^8$ Hz are used.

It should be stressed, however, that the supply frequency is not the only controlling factor. In fact, control of this process is complex, involving other parameters:

1. The details of the synthesis reactions, including:
   a. Extinction limit (no combustion even upon intense initiation)
   b. Stability limit (steady or unsteady wave propagation)
   c. Front propagation velocity
   d. Maximum combustion temperature
   e. Heating rate in the combustion front
   f. Pulsation frequency, hot spot velocity, etc. (in case of unsteady combustion)
   g. Extent of conversion
2. The power density of the induction coil.
3. The rate of heat transfer to the substrate.
4. The rate of coil translation.
5. Heat of reaction of the precursors.
6. Changes in the heat capacity of the reactants, products, and substrate as a function of temperature.
7. Change in the magnetic permeability of the substrate as a function of temperature.
8. Change in the magnetic susceptibility of the substrate as a function of temperature.
9. Change in the electrical resistivity and heat capacity of the substrate as a function of temperature;
10. Radiative, convective, conductive, and evaporation losses.
11. Heat exchanges due to phase changes (e.g. melting of the substrate).

The substrate surface temperature is increased by induction heating to start the synthesis reaction in the polymer film. For example, the synthesis of Boron Nitride by the following reaction, uses an initiation temperature of 900° C. Once the reaction starts, heat of reaction will be released that will (i) provide the thermal impetus to further reaction and (2) raise the temperature of the substrate. The heat input to the substrate and the rate of induction coil translation will be optimized such that during and momentarily after the synthesis of reaction products, a layer of the substrate is molten (between 0.00001 and 0.1 inch, depending on the application requirements) and immediately refreezes as the heating coil moves to the adjacent location.

In this embodiment, the components shown in FIG. 3A, i.e., Ti, $B_2O_3$ and B, react with $NH_3$ in the atmosphere of the reaction chamber to form a coating of $TiB_2$ and BN via the following net reaction:

By changing the relative amount of reactants, the stoichiometry of the products, i.e., the ratio of $TiB_2$ to BN, can be adjusted based on the needs of the particular application.

Figure 7:
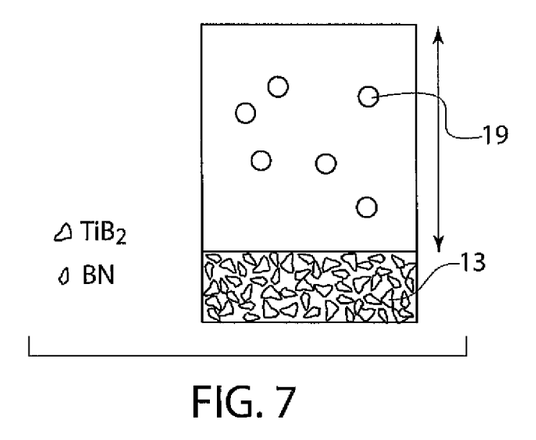
FIG. 7 shows a cross-sectional view of the coating surface during induction heating, after the reaction of the precursor compounds.

Titanium diboride, $TiB_2$, is an extremely hard ceramic, and Boron Nitride, BN, is highly lubricating. The combination of both components makes for an ideal surface for applications such as gun barrels and biomedical implants. Other materials could also be used, however. The coating created through the process according to the invention is highly resistant to erosion and thermal and mechanical stress cycles. The polymer binder 19 evaporates off during the heating process, as shown in FIG. 7.

Figure 8:
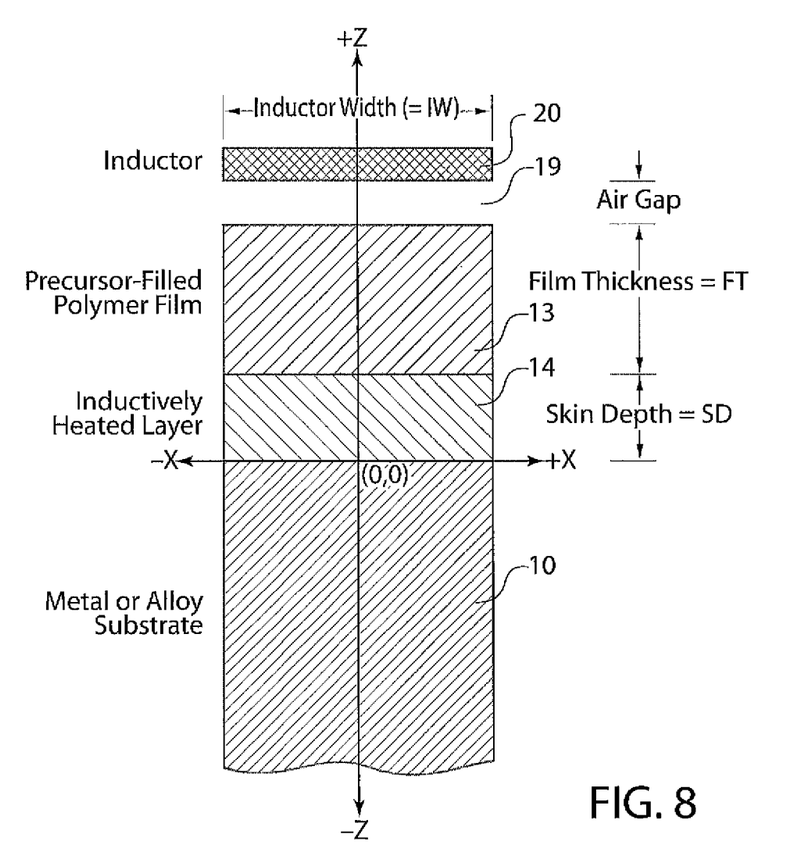
FIG. 8 shows a cross-sectional view of the substrate at the beginning of induction heating.

FIG. 8 shows an inductor above the polymer coated substrate with an air gap 19. The polymer film layer 13, which contains the precursor powder mixture is of thickness FT. When the inductor 20 is powered, the supply frequency is chosen so as to produce a skin depth 14, which is the depth at which the substrate is heated due to the induction heating. Once initiated, the reaction of ceramic synthesis progresses rapidly through the thickness of the polymer film layer 13, which (a) creates the ceramic particles, (b) vaporizes the polymer film, and (c) raises the temperature of the substrate to some level above the melting temperature of the substrate within the skin depth (i.e. the region of the surface that is already heated by electro-magnetic induction). In order to illustrate the thermal profiles, a coordinate system is shown (X-Z), with the (0,0) as shown. Note that the Y axis would be normal to the plane of the paper and can be considered to be equivalent to the X axis. The Z-axis extends along the depth of the substrate.

Figure 9:
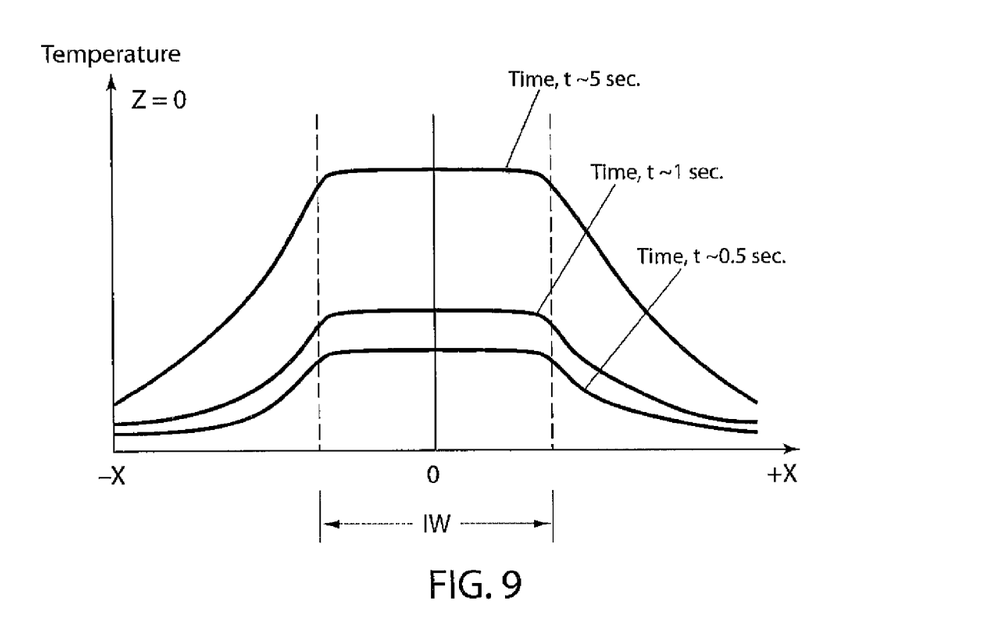
FIG. 9 shows a graph of the temperature of the substrate over time during the induction heating process over the width of the inductor.

FIG. 9 shows temperature profiles in the X direction after power is supplied to the inductor. The times are shown to illustrate that the process of heating up occurs rapidly within the skin depth of the substrate. IW refers to the width of the inductor 20. The areas immediately under inductor 20 and within the skin depth are heated quickly, and the areas outside of these limits are not, so rapid cooling occurs once the inductor passes by a given area of the substrate surface.

Figure 10:
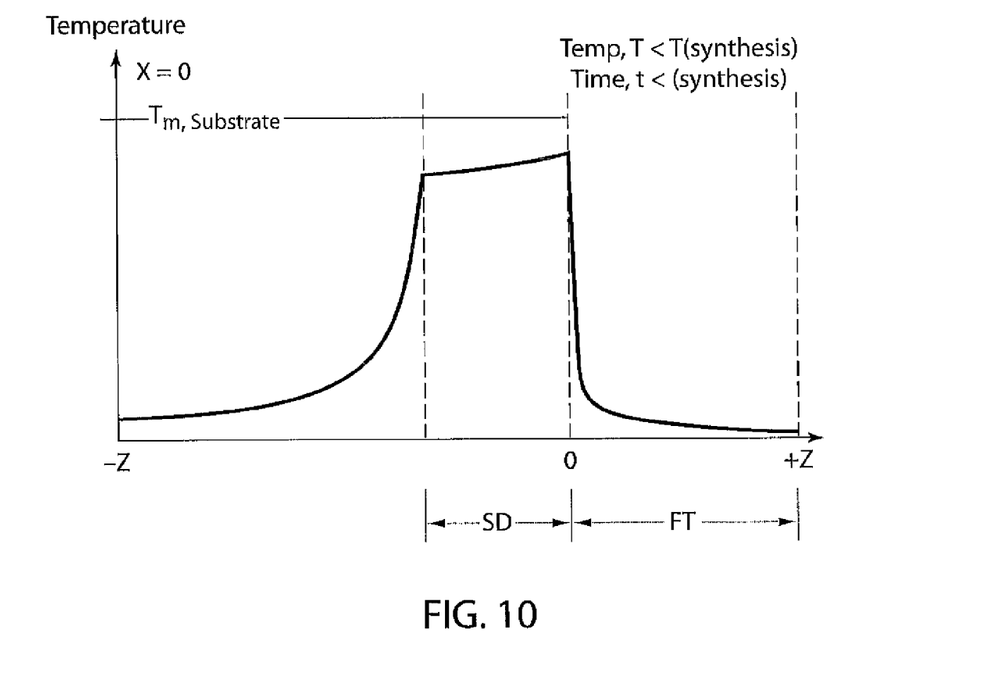
FIG. 10 shows a graph of the temperature of the substrate and coating during induction heating.

FIG. 10 shows the corresponding temperature profile in the Z direction (after approximately 5 seconds of power application). At the time shown in FIG. 10, representing a transient, intermediate state, the maximum temperature is below both the melting temperature Tm of the substrate and the reaction temperature of the powder particles held in suspension in the polymer film. The power input of the inductor is controlled such that the surface temperature of the substrate and thus the inner surface of the polymer film is increased very rapidly to the reaction temperature of the powder mass (i.e. in less than 30 seconds after power is applied). Once initiated, the reaction of ceramic synthesis progresses rapidly through the thickness of the polymer film FT, which (a) creates the ceramic particles, (b) vaporizes the polymer film, and (c) raises the temperature of the substrate to some level above the melting temperature of the substrate within the skin depth SD (i.e. the region of the surface that is already heated by electro-magnetic induction).

Figure 11:
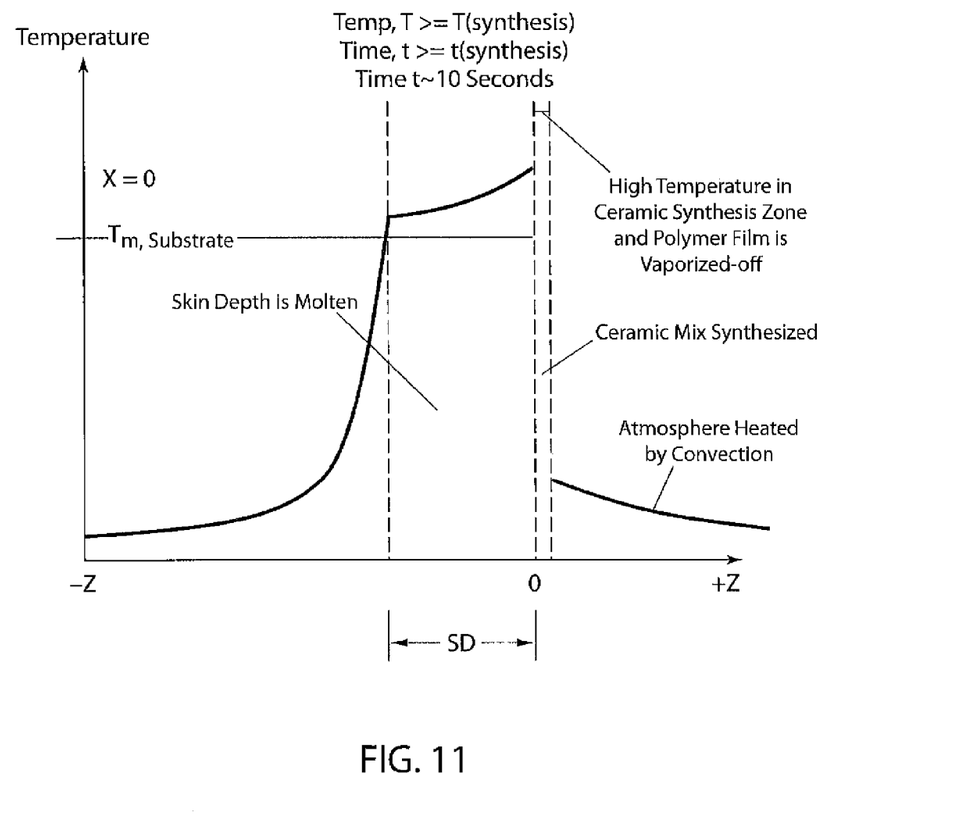
FIG. 11 shows a graph of the temperature of the substrate, coating and atmosphere over time.

FIG. 11 shows the thermal profile in the Z direction after initiation of synthesis reaction(s) in the polymer film. The temperature at the skin depth SD is greater than the melting temperature of the substrate Tm, and the temperature at the surface is greater than the reaction temperature of the polymer mix. The polymer film is vaporized off as the reaction propagates rapidly through the thickness of the polymer film. At the same time, a portion of the heat of reaction that is released is transferred to the substrate that is already heated by induction heating and is molten due to the additional heat input (achieved via process optimization).

Figure 12:
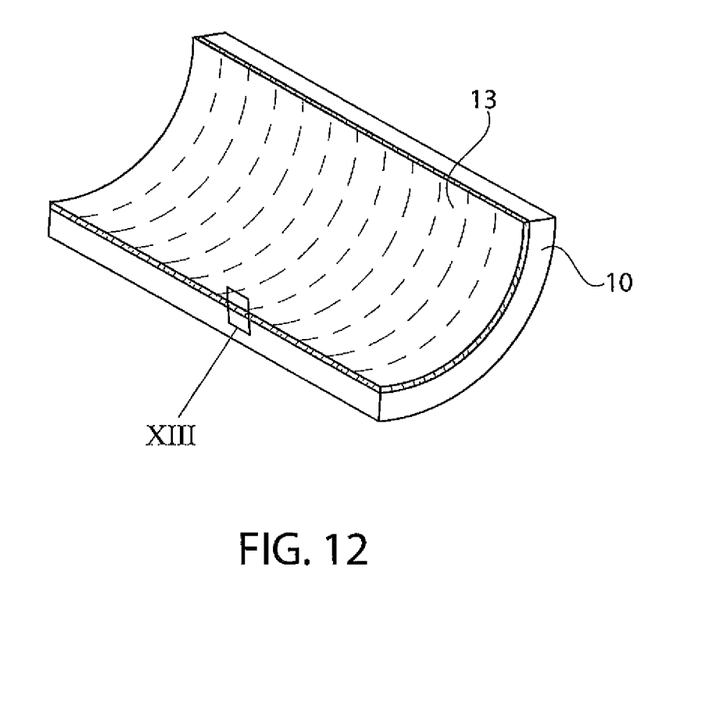
FIG. 12 shows the substrate with the coating after processing is complete.
Figure 13:
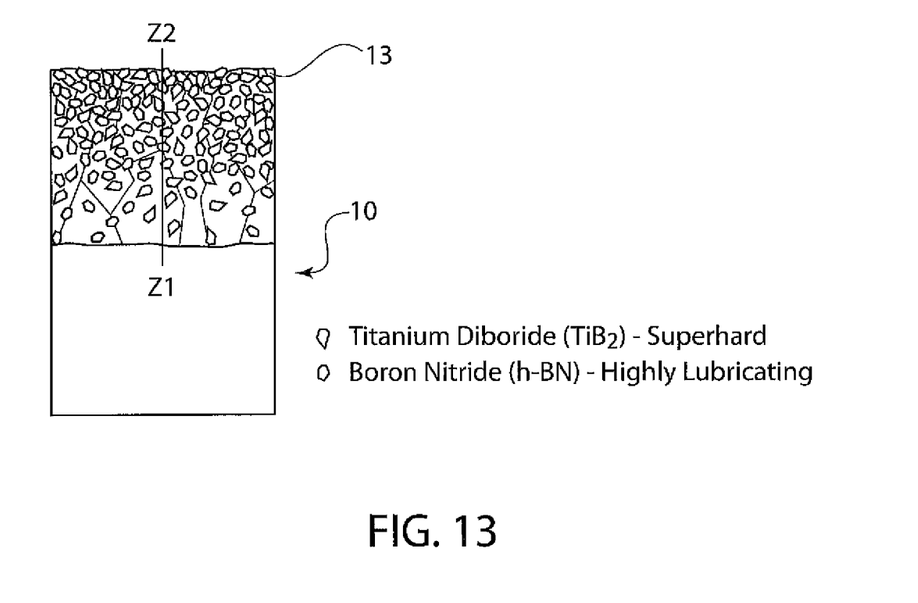
FIG. 13 shows a cross-section along portion XIII of FIG. 12.

FIGS. 12 and 13 show the ACES-modified substrate 10 after the induction heating process has been completed. The precursors contained in polymer coating 13 on substrate 10 have now reacted and mixed with the molten layer of substrate 10 to create a compositional gradient with increasing amounts of ceramic or intermetallic constituents present in the substrate approaching the surface, from point Z1 below the skin depth to Z2 at the surface.

Figure 14:
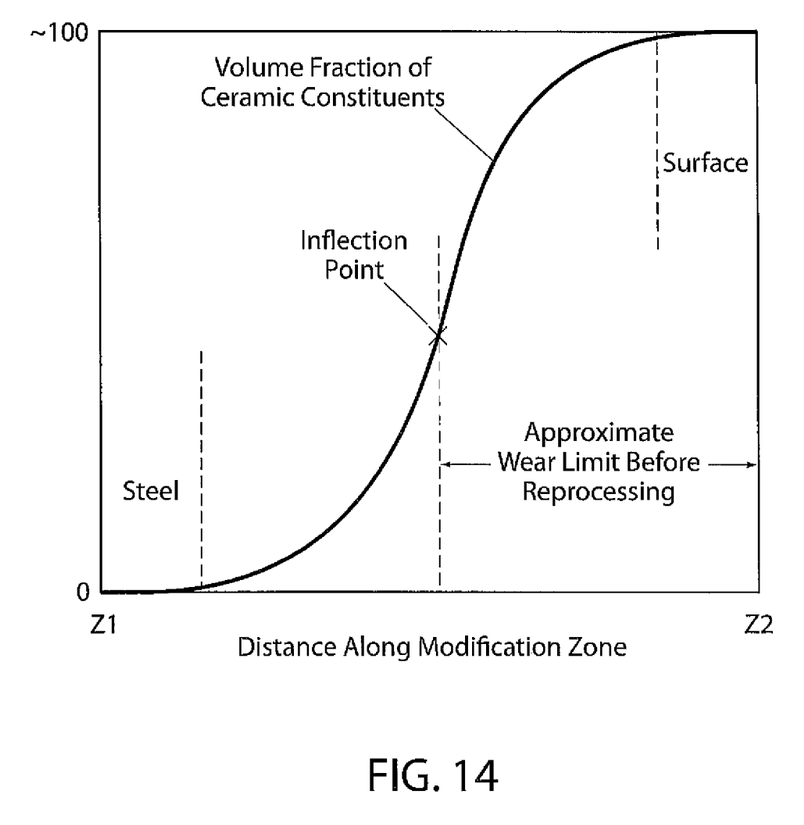
FIG. 14 shows a graph of the volume fraction of ceramic coating constituents in the substrate within the region of the substrate that is modified.

FIG. 14 shows a graph of the volume fraction of the ceramic constituents of FIG. 13 along the depth of the substrate, after the induction heating process is completed. Along the depth of the surface modification, the volume fraction of ceramic constituents in the modified region changes from 0% below the skin depth (At Z1) to substantially 100% at the surface of the substrate (Z2). The inflection point is the point at which the ceramic-rich layers are worn to such a degree that reprocessing should occur.

In summary, heating of the substrate will start synthesis reactions between the mixture of precursor particles held within the polymer film. The reactions, being highly exothermic, generate a significant amount of heat. As a result, the polymer film will start to vaporize off, leaving behind pure products of the synthesis reactions. At this stage, if the heat transfer is adjusted such that a thin layer of a portion of the induction-heated "skin" is melted, then the synthesized ceramic particles will mix with the molten layer of the substrate. Furthermore, because of the induction heating, the molten zone will be stirred due to induced eddy currents, thus thoroughly mixing the ceramic particles with the molten substrate.

As the inductor moves away, the heat transfer will be primarily through the substrate and the molten substrate layer will start to regrow (i.e. resolidify). During regrowth, some of the ceramic particles will be trapped, while a majority will be rejected ahead of the solidification front. As a result, the average composition of the regrowth region will gradually change from a low volume fraction of ceramic particles to a high volume fraction, eventually reaching almost 100% on the outer surface, as shown in FIGS. 12 and 13. In this manner, the present invention combines in the same processing sequence both the synthesis and the incorporation of a multicomponent ceramic mixture. Furthermore, a trapping gradient that is the natural result of this unique process will generate a surface modification zone with compositional (and therefore functional) gradation.

Accordingly, while only a few embodiments of the present invention have been shown and described, it is obvious that many changes and modifications may be made thereunto without departing from the spirit and scope of the invention.

What is claimed is:

1. A method for surface engineering a metal substrate, comprising the following steps:
    mixing at least two precursor constituents in powder form with a polymer binder to create a coating mix;
    coating the substrate with the coating mix;
    heating the substrate by electromagnetic induction, and controlling a frequency and duration of the heating to cause a reaction within the coating mix to create a desired mixture of ceramic or intermetallic constituents, evaporate the polymer binder, melt a portion of the substrate, and cause the ceramic or intermetallic constituents to mix with the substrate and form a compositionally graded surface modification region after the substrate re-solidifies, wherein the step of heating the substrate by electromagnetic induction is controlled such that the temperature of surface regions of the substrate is brought close to the melting temperature of the substrate but not high enough to cause the substrate to melt;

wherein the reaction within the coating mix generates heat that supplies additional heat to the substrate to further raise the temperature of the substrate such that a portion of the substrate melts;

wherein the mixing of the ceramic or intermetallic constituents with the molten portion of the substrate occurs via induced eddy currents from the induction heating;

wherein upon removal of a source of the electromagnetic induction heating, the molten portion of the substrate resolidifies;

wherein the ceramic or intermetallic constituents are redistributed within the resolidified substrate at decreasing percentages along a depth of the substrate so that the ceramic or intermetallic constituents vary from 100% at a surface of the substrate to 0% at a defined depth of the substrate, and wherein the step of controlling the frequency includes adjusting the frequency to adjust a depth of the modification region, wherein a higher frequency leads to a smaller depth of the modification region.

2. The method according to claim 1, wherein the precursor constituents are compounds containing elements selected from the group consisting of nickel, aluminum, titanium, iron, molybdenum, boron, silicon and carbon.

3. The method according to claim 2, wherein the ceramic or intermetallic constituents are selected from the group consisting of nickel-aluminide, iron-aluminide, titanium-aluminide, molybdenum-disilicide, iron-silicide, titanium-diboride, titanium-carbide, silicon-carbide and boron-carbide.

4. The method according to claim 1, wherein the step of mixing the at least two precursor constituents occurs in an inert atmosphere.

5. The method according to claim 1, wherein the step of mixing comprises the step of stirring the coating mix to maintain a homogeneous mixture.

6. The method according to claim 1, wherein the step of heating occurs in an atmosphere of $NH_3$.

7. The method according to claim 1, wherein the surface modification region is at most 5% of a thickness of the substrate.

* * * * *